(12) United States Patent
Keatley

(10) Patent No.: US 8,827,297 B2
(45) Date of Patent: Sep. 9, 2014

(54) FIFTH WHEEL SUPPORT ASSEMBLY WITH SLIDE LIMITER

(71) Applicant: SAF-Holland, Inc., Holland, MI (US)

(72) Inventor: Justin Keatley, Zeeland, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 13/834,420

(22) Filed: Mar. 15, 2013

(65) Prior Publication Data

US 2013/0285347 A1 Oct. 31, 2013

Related U.S. Application Data

(60) Provisional application No. 61/639,412, filed on Apr. 27, 2012.

(51) Int. Cl.
*B62D 53/08* (2006.01)
*B62D 53/06* (2006.01)
*B60D 1/01* (2006.01)

(52) U.S. Cl.
CPC ............... *B60D 1/015* (2013.01); *B62D 53/06* (2013.01); *B62D 53/08* (2013.01)
USPC ........ 280/407; 280/433; 280/438.1; 280/439; 280/441; 280/149.2

(58) Field of Classification Search
CPC ........... B62D 53/0814; B62D 53/0807; B62D 53/10; B62D 21/05; B62D 21/09; B62D 53/08; B62D 53/06; B62D 53/00; B60D 1/44
USPC .............. 280/407, 438.1, 433, 495, 781, 441, 280/149.2
See application file for complete search history.

(56) References Cited

U.S. PATENT DOCUMENTS

| | | | | |
|---|---|---|---|---|
| 2,903,275 | A * | 9/1959 | Walther | 280/407 |
| 3,584,899 | A * | 6/1971 | Gottler et al. | 280/407 |
| 3,834,736 | A * | 9/1974 | Dodgson | 280/407 |
| 4,838,566 | A * | 6/1989 | Baxter et al. | 280/149.2 |
| 4,993,737 | A * | 2/1991 | Torcomian | 280/407 |
| 6,435,536 | B2 * | 8/2002 | Eckelberry | 280/407.1 |
| 7,699,334 | B1 * | 4/2010 | Mann et al. | 280/407.1 |
| 8,342,557 | B2 * | 1/2013 | Sibley et al. | 280/438.1 |
| 8,573,627 | B2 * | 11/2013 | Appel | 280/441 |
| 2004/0173992 | A1 * | 9/2004 | Stunder et al. | 280/438.1 |
| 2007/0007747 | A1 * | 1/2007 | Laarman | 280/438.1 |
| 2009/0230655 | A1 * | 9/2009 | Schmidt et al. | 280/407 |

* cited by examiner

*Primary Examiner* — Joseph M Rocca
*Assistant Examiner* — Daniel Yeagley
(74) *Attorney, Agent, or Firm* — Price Heneveld LLP

(57) ABSTRACT

A sliding fifth wheel hitch assembly includes a longitudinal rail having a substantially vertical side member, a first end portion, and a second end portion. At least one carriage bracket is slidably engaged with the longitudinal rail. The carriage bracket is adapted to support a hitch plate. An engagement assembly is coupled with the carriage bracket for releasably engaging the longitudinal rail along a length of the longitudinal rail between the first and second end portions. At least one slide stop laterally extends from the substantially vertical side member of the longitudinal rail proximate at least a select one of the first end portion and the second end portion. The slide stop is positioned to abut the carriage bracket, thereby limiting a sliding motion of the hitch plate with respect to the longitudinal rail.

11 Claims, 6 Drawing Sheets

FIFTH WHEEL SUPPORT ASSEMBLY WITH SLIDE LIMITER

CROSS REFERENCE TO RELATED APPLICATION

The present application claims the benefit under 35 USC §119(e) of provisional application Ser. No. 61/639,412, filed Apr. 27, 2012, entitled FIFTH WHEEL SUPPORT ASSEMBLY WITH SLIDE LIMITER, the entire contents of which are incorporated herein by reference.

FIELD OF THE INVENTION

The present invention generally relates to fifth wheel hitch plate assemblies. More specifically slidable hitch plate assemblies for fifth wheels, wherein the sliding motion of the hitch plate is limited.

BACKGROUND OF THE INVENTION

Fifth wheel hitch assemblies have been adapted to include a slidably movable portion. Restricting slidable movement of such hitch assemblies has required additional manufacturing steps and costs adding weight to the vehicle and deficiently distributing force to a vehicle's frame.

SUMMARY OF THE INVENTION

According to one aspect of the present invention, a sliding fifth wheel hitch assembly includes a longitudinal rail having a substantially vertical side member, a first end portion, and a second end portion. At least one carriage bracket is slidably engaged with the longitudinal rail. The carriage bracket is adapted to support a hitch plate. An engagement assembly is coupled with the carriage bracket for releasably engaging the longitudinal rail along a length of the longitudinal rail between the first and second end portions. At least one slide stop laterally extends from the substantially vertical side member of the longitudinal rail proximate at least a select one of the first end portion and the second end portion. The slide stop is positioned to abut the carriage bracket, thereby limiting a sliding motion of the hitch plate with respect to the longitudinal rail.

According to another aspect of the present invention, a sliding fifth wheel hitch assembly includes a rail having a substantially vertical side member. A carriage bracket is slidably engaged with the rail and extends upward to support a hitch plate. The carriage bracket has a forward bumper and a rearward bumper laterally adjacent to an exterior surface of the side member. An engagement assembly is operably coupled with the carriage bracket and releasably engaging the rail along a length of the rail, thereby selectively positioning the hitch plate with respect to the rail. A slide limiting assembly is coupled with the exterior surface of side member. The slide limiting assembly is positioned to abut a select one of the forward bumper and the rearward bumper for limiting a sliding travel of the hitch plate with respect to the rail.

According to yet another aspect of the present invention, a sliding fifth wheel hitch assembly includes a longitudinal rail that has a substantially vertical side member including a plurality of engagement apertures spaced longitudinally along the side member. A carriage bracket is slidably engaged with the rail and has an upper portion coupled with a hitch plate and a lower portion laterally adjacent to an exterior surface of the side member. The lower portion includes a forward bumper and a rearward bumper. An engagement assembly is operably coupled with the carriage bracket and is releasably engaging at least a select one of the plurality of engagement apertures for selectively positioning the hitch plate with respect to the rail. A slide stop includes a body portion that abuts the exterior surface of the side member. The slide stop also includes at least one attachment feature laterally extending from the body portion and removably engaging at least one of the plurality of engagement apertures. The body portion is positioned to abut a select one of the forward bumper and the rearward bumper for limiting a sliding travel of the hitch plate with respect to the rail.

According to another aspect of the present invention, a slide limiting assembly employed on a slideable fifth wheel hitch plate assembly creates, among other things, a safety mechanism that attempts to prevent a hitch plate assembly from detaching from a vehicle. Further, a slide stop coupled with a substantially vertical side member of a rail in the manner described herein reduces manufacturing time and costs and improves force distribution to a vehicle frame upon loading a slide stop.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
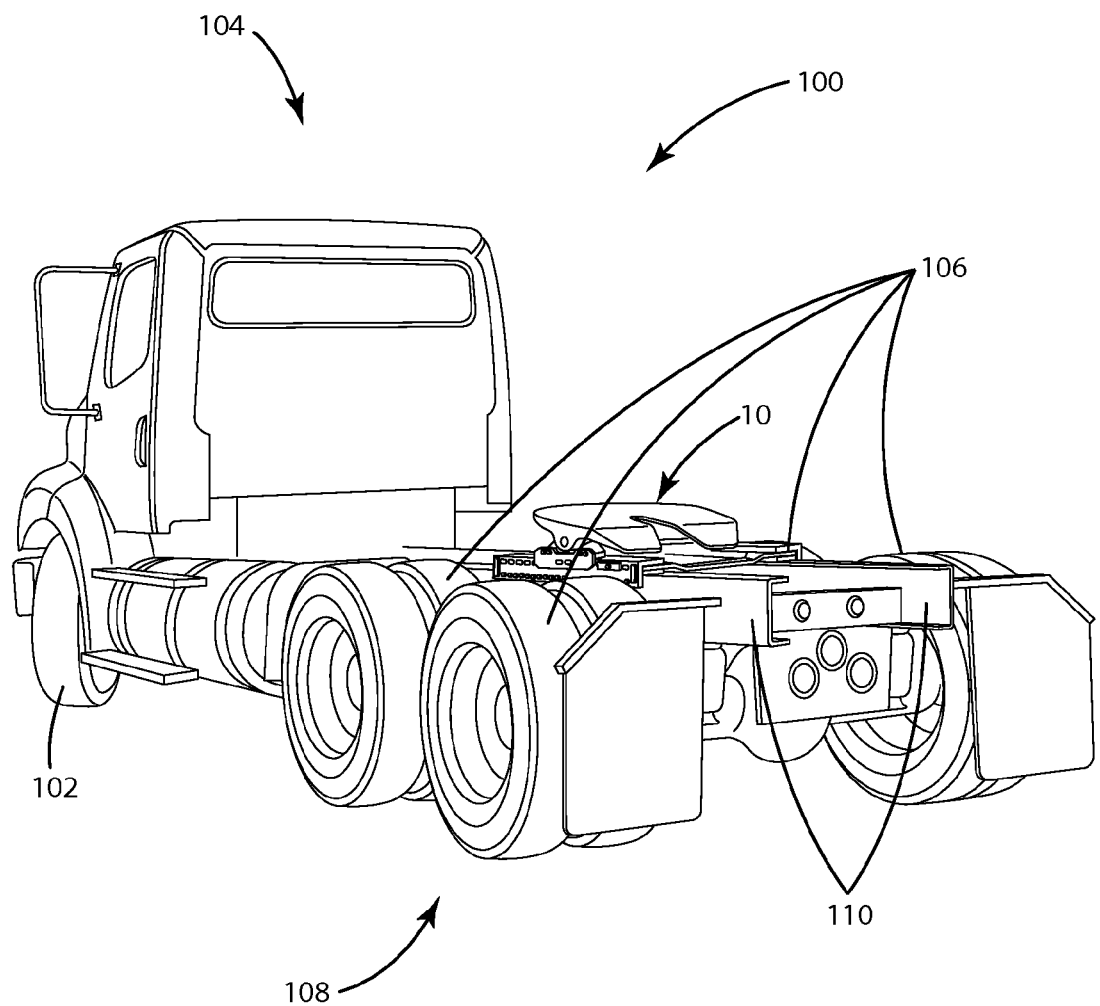
FIG. 1 is a top perspective view of a tractor vehicle having a sliding fifth wheel hitch assembly.

For purposes of the description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of inventive concepts defined in the appended claims. Hence, specific dimensions and other physical characteristics relating to the embodiments disclosed herein are not to be considered as limiting, unless the claims expressly state otherwise.

Referring to FIGS. 1-12, reference numeral 10 generally refers to a sliding fifth wheel hitch assembly. The sliding fifth wheel hitch assembly 10 includes a longitudinal rail 12 having a substantially vertical side member 14, a first end portion 16, and a second end portion 18. A carriage bracket 20 is slidably engaged with the longitudinal rail 12, and the carriage bracket 20 is adapted to support a hitch plate 22. An engagement assembly 24 is coupled with the carriage bracket 20 for releasably engaging the longitudinal rail 12 along a length of the longitudinal rail 12 between the first and second end portions 16, 18. A slide stop 26 laterally extends from the substantially vertical side member 14 of the longitudinal rail 12 proximate the first end portion 16 and/or the second end portion 18 of the longitudinal rail 12. The slide stop 26 is positioned to abut the carriage bracket 20 for limiting a sliding motion of the hitch plate 22 with respect to the longitudinal rail 12.

Referring now to FIG. 1, the reference numeral 100 generally designates a vehicle having one embodiment of the sliding fifth wheel hitch assembly 10. In the illustrated example, the vehicle 100 is a six wheel tractor semi truck designed to pull a trailer. Accordingly, the vehicle 100 has two front wheels 102 configured to substantially support a front portion 104 of the vehicle 100, including the cab area, and four rear wheels 106 positioned behind the front portion 104 of the vehicle 100. However, it is contemplated that the vehicle 100 may include alternative wheel arrangements with more or fewer tires. The four rear wheels 106 are configured to substantially support a rear portion 108 of the vehicle's frame that includes the sliding fifth wheel hitch assembly 10. The rear portion 108 of the frame of the vehicle includes a pair of frame members 110 longitudinally extending in generally parallel alignment. The frame members 110 have a U-shaped cross section with a channel portion of each frame member 110 facing inboard and a substantially planar surface facing outboard. It is also contemplated that the frame members 110 may have alternative cross-sectional shapes from the illustrated embodiment, such as an L-shaped or I-shaped cross-section.

Figure 2:
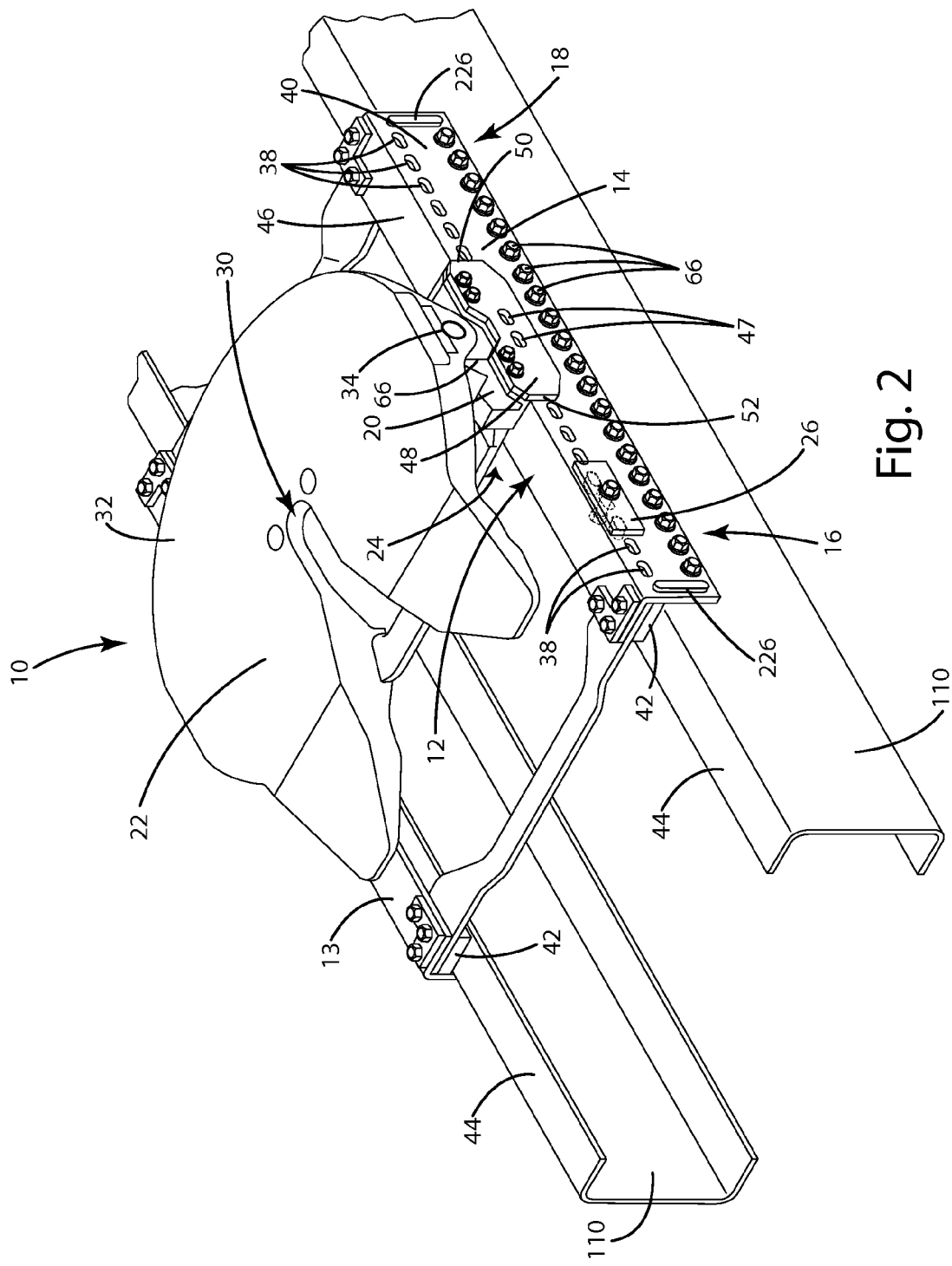
FIG. 2 is a top perspective view of one embodiment of the sliding fifth wheel hitch assembly on a rear portion of a vehicle frame.

As shown in FIG. 2, one embodiment of the sliding fifth wheel hitch assembly 10 includes the hitch plate 22 having a throat 30 for receiving a kingpin of a trailer and a top surface 32 for engaging and supporting the trailer's underside surface proximate the kingpin. The hitch plate 22 has a generally horseshoe shape and is mounted centrally between the frame members 110 of the vehicle 100 to position the throat 30 in a rearward facing direction, as generally understood by one having ordinary skill in the art. The hitch plate 22 also has a lateral pivot pin 34 positioned on a side portion of the hitch plate 22 to pivotally couple the hitch plate 22 with the carriage bracket 20 and provide a horizontal pivot axis extending laterally between the frame members 110 and centrally with respect to the hitch plate 22, generally aligning with a distal end of the throat 30. The pivot pin 34 couples with an upper portion 36 of the carriage bracket 20 to allow the hitch plate 22 to pivot relative to the carriage bracket 20 and the frame members 110 of the vehicle 100. It is conceivable that additional embodiments of the sliding fifth wheel hitch assembly 10 have the hitch plate 22 fixedly coupled with the carriage bracket 20 or alternatively arranged on the carriage bracket 20.

In the embodiment illustrated in FIG. 2, the sliding fifth wheel hitch assembly 10 includes the illustrated carriage bracket 20 and a second carriage bracket that on the opposing lateral side of the vehicle 100 that is a mirror image of the carriage bracket 20 shown in FIG. 2. The second carriage bracket similarly slidably engages a second longitudinal rail 13 on the opposing lateral side of the vehicle 100, which is also a mirror image of the longitudinal rail 12 supporting the carriage bracket 20. Accordingly, it is understood that other components of the illustrated sliding fifth wheel hitch assembly 10 include mirror image counterparts on the second longitudinal rail 13, unless specified otherwise.

As also shown in FIG. 2, the carriage bracket 20 slidably engages the longitudinal rail 12 that is coupled with and supported by the frame members 110 of the vehicle 100 (FIG. 1). The substantially vertical side member 14 of the longitudinal rail 12 includes a plurality of engagement apertures 38 spaced longitudinally along a length of the side member 14, extending between an exterior surface 40 and an interior surface of the side member 14. The side member 14 is mechanically coupled with the frame member 110 by a number of fasteners 66 spaced in a row below the plurality of engagement apertures 38. However, it is contemplated that the rail 12 may be an integral piece of the frame member 110 in alternative embodiments. A spacer 42 is positioned between an upper surface 44 of the frame member 110 and a top member 46 of the longitudinal rail 12 at the first and second end portions 16, 18 of the longitudinal rail 12. The spacer 42 raises the longitudinal rail 12 to expose the interior surface of the side member 14 and the plurality of engagement apertures 38.

With the spacer 42 raising the longitudinal rail 12, as shown in FIG. 2, the engagement assembly 24 coupled with the carriage bracket 20 may releasably engage the interior surface of the side member 14 of the rail 12 by inserting an engagement pin in at least a select one of the plurality of engagement apertures 38 for selectively positioning the carriage bracket 20 and the hitch plate 22 with respect to the longitudinal rail 12. The engagement pin of the engagement assembly may further extend through a select one of the plurality of engagement apertures 38 to also engage holes 47 formed in the carriage bracket 20. Accordingly, the engagement assembly 24 is adapted to disengage the plurality of engagement apertures 38 and the holes 47 to allow the carriage bracket 20 to slide on the longitudinal rail 12 between the first end portion 16 and the second end portion 18. When the engagement assembly 24 is disengaged and slid longitudinally to an alternative position, the engagement assembly 24 may reengage the longitudinal rail 12 to secure the carriage bracket 20 from moving with respect to longitudinal rail 12 for allowing the vehicle 100 to tow a trailer. It is also contemplated that the engagement assembly 24 may additionally or alternatively engage other portions of the rail 12 or the frame members 110, such as a series of indentations or protrusions. Preferably, a single user may operate the engagement assembly 24 from one side of the vehicle 100. However, it is conceivable that an automated device could operate the engagement assembly 24, including from remote locations of the vehicle 100.

Still referring to FIG. 2, the upper portion 36 of the carriage bracket 20 protrudes upward from the top member 46 of the longitudinal rail 12 to pivotally couple with and support the hitch plate 22 about the pivot pin 34. A base portion of the carriage bracket 20 slidably engages and generally extends longitudinally along a top surface of the top member 46 within the longitudinal length of the hitch plate 22. The carriage bracket 20 also includes a lower portion 48 that extends down from the base portion laterally adjacent to an exterior surface 40 of the side member 14 of the longitudinal rail 12. More specifically, the lower portion 48 includes a bumper plate coupled with the base portion of the carriage bracket 20 using fasteners, such that the bumper plate is in planar alignment and in close proximity with the exterior surface 40 of the side member 14. The bumper plate includes a forward bumper 50 and a rearward bumper 52 defined, respectively, as forward and rearward facing surface of the bumper plate that are each designed to absorb the forces created when the lower portion 48 of the carriage bracket 20 collides with and abuts the slide stop 26. It is conceivable that the forward and rearward bumpers 50, 52 may include additional materials to bolster the bumper plate, such as an elastomeric material, a polymeric material, or a metallic material. Further, it is contemplated that the bumper plate may be an integral piece of the carriage bracket 20, along with any additional bolstering material on the bumper plate.

Figure 3:
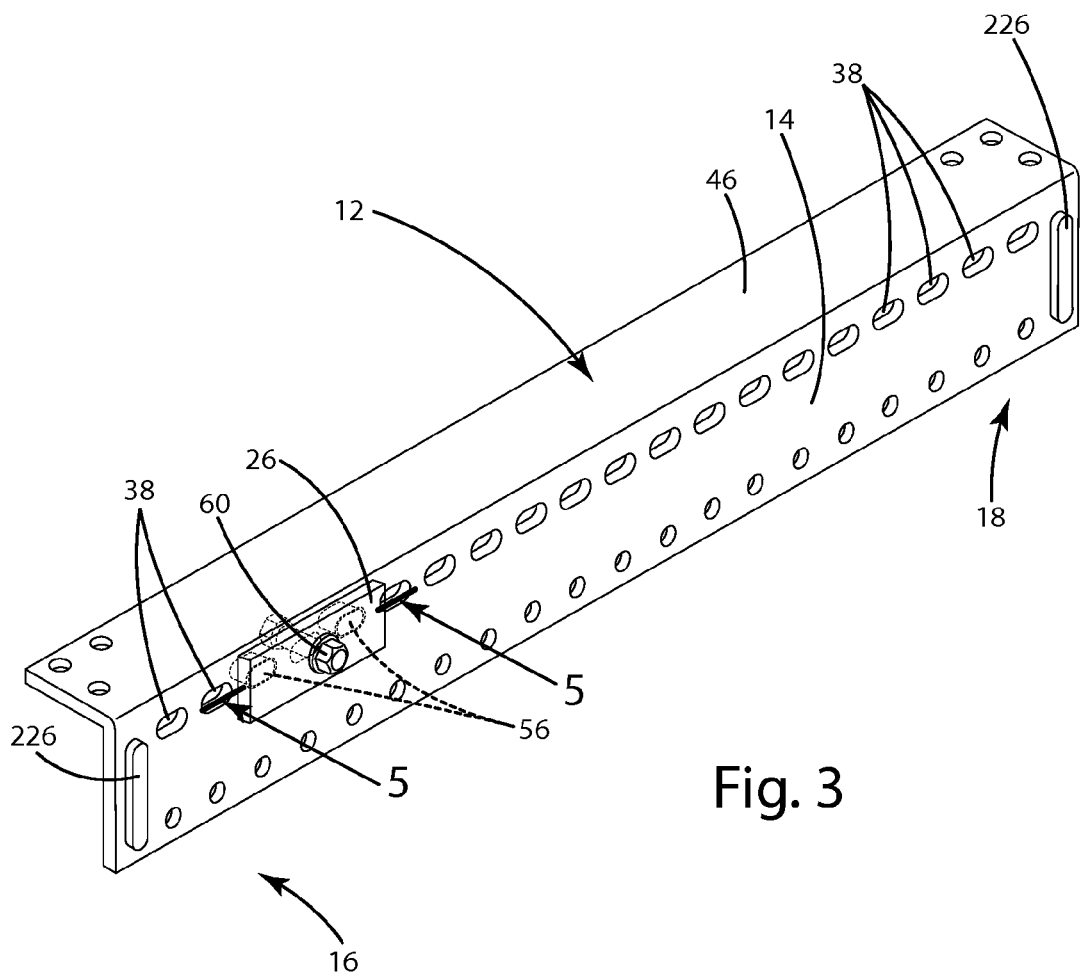
FIG. 3 is a top perspective view of a longitudinal rail of the sliding fifth wheel hitch assembly having one embodiment of a slide stop.

Referring now to FIG. 3, the illustrated embodiment of the slide stop 26 includes a slide limiting assembly coupled with the exterior surface 40 of side member 14. The slide stop 26 removably engages at least one of the plurality of engagement apertures 38, which have a substantially ovular shape, either longitudinally in front of or behind the carriage bracket 20 (FIG. 2). The slide stop 26 is positioned to abut either the forward bumper 50 or the rearward bumper 52 for limiting a sliding travel of the hitch plate 22 with respect to the longitudinal rail 12. In the illustrated embodiment, the slide stop 26 engages three consecutive apertures in the row of the plurality of engagement apertures 38. However, it is contemplated that the slide stop 26 may engage as few as one of the plurality of engagement apertures 38 or more than three, or the slide stop 26 may be formed an integral piece of the rail 12, as explained in more detail below.

Figure 4:
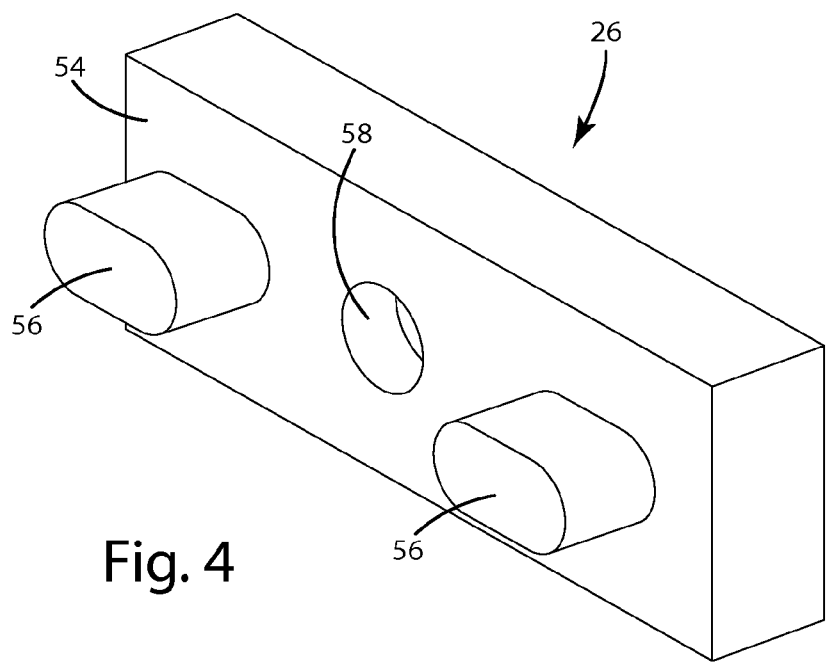
FIG. 4 is a top perspective view of a slide stop.

As shown in FIGS. 3-4, one embodiment of the slide stop 26 includes a body portion 54 abutting the exterior surface 40 of the side member 14 that positioned in on the side member 14 to abut a select one of the forward bumper 50 and the rearward bumper 52 (FIG. 2) for limiting the sliding travel of the hitch plate 22 with respect to the rail 12. The illustrated slide stop 26 also has two attachment features 56 laterally extending from the body portion 54 that each removably engage one of the plurality of engagement apertures 38. A mounting aperture 58 extends through the body portion 54 and is centrally positioned between the two attachment features 56. A mechanical fastener 60 extends through the mounting aperture 58 and one of the plurality of engagement apertures 38 to secure the slide stop 26 with the longitudinal rail 12. Accordingly, the illustrated slide stop 26 may be removed from the three engagement apertures of the plurality of engagement apertures 38 and inserted at any position on the side member 14 that corresponds with three consecutive apertures of the plurality of engagement apertures 38, allowing the slide stop 26 to have a customized position for limiting the potential sliding travel of the hitch plate 22.

Figure 5:
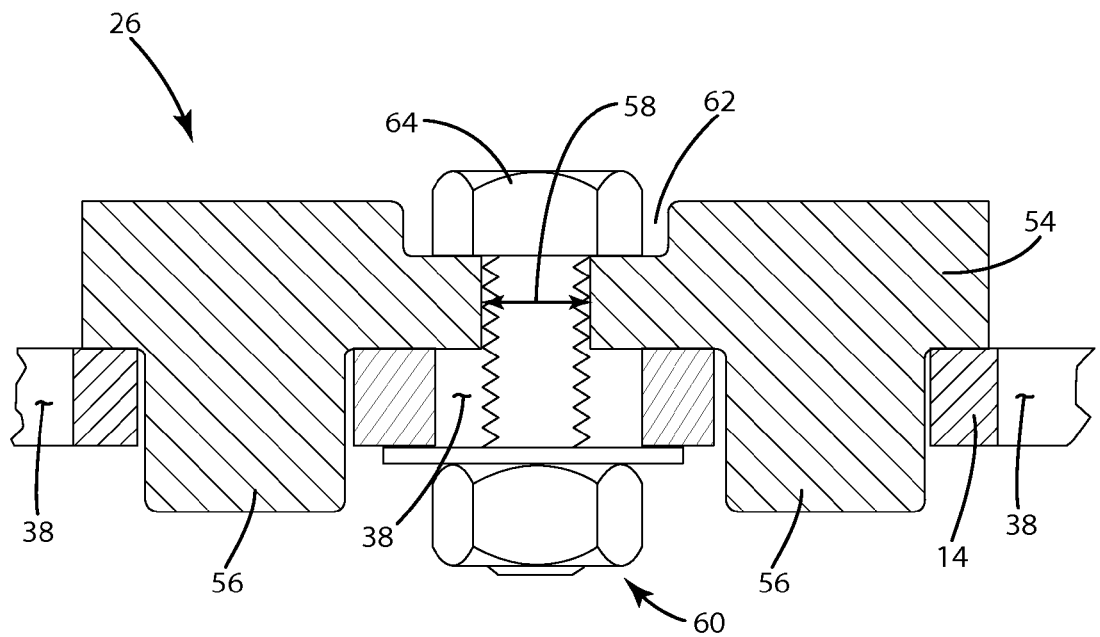
FIG. 5 is a cross-sectional view of the slide stop, taken at line 5-5 of FIG. 3.
Figure 6:
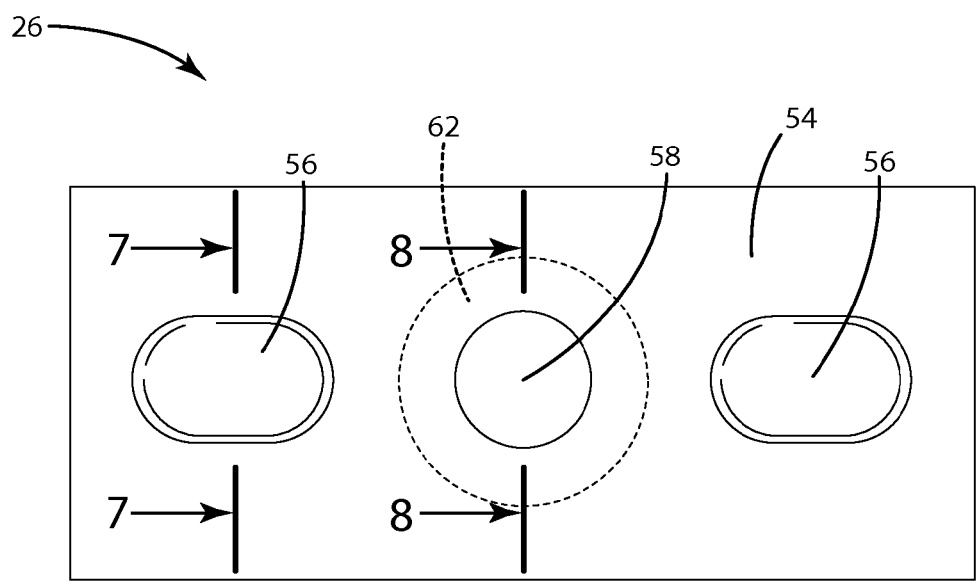
FIG. 6 is side elevational view of the slide stop.
Figures 7, 8:
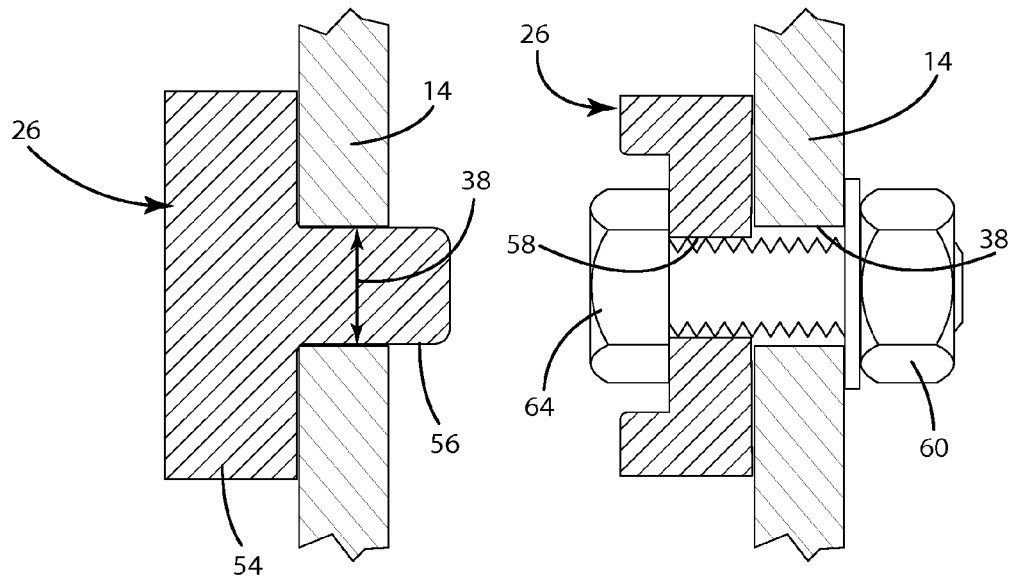
FIG. 7 is a cross-sectional view of an attachment feature the slide stop, taken at line 7-7 of FIG. 6.
FIG. 8 is a cross-sectional view of a fastener extending through a mounting aperture of the slide stop, taken at line 8-8 of FIG. 6.

As further illustrated in FIGS. 5-7, the attachment features 56 protrude from the body portion 54 having a generally ovular shaped cross section and a length greater than the thickness of the side member 14 (FIG. 7) to substantially occupy the entire area of the corresponding ovular shaped engagement apertures 38 (FIG. 3). The mounting aperture 58, however, includes a cylindrical shaped opening positioned centrally between the attachment features 56 and also in vertical alignment with attachment features 56 to define a linear arrangement of the attachment features 56 and the mounting aperture 58. The mounting aperture 58 has a diameter substantially similar to the vertical thickness of the attachment features 56, leaving open areas adjacent to the mechanical fastener 60 within the ovular shaped engagement aperture. Accordingly, the attachment features 56 are configured to receive the majority of the forces from the forward or rearward bumper 50, 52, while the mechanical fastener 60 is arranged centrally within the ovular shaped engagement aperture 38, such that the mechanical fastener 60 transmits none or a small amount of the forces between the forward or rearward bumper 50, 52 and the longitudinal rail 12 (FIG. 2). It is, however, conceivable that the engagement apertures 38 and attachment features 56 may have an alternative shape, such as a cylindrical shape, whereby the mounting aperture 58 and the corresponding mechanical fastener 60 may include a smaller diameter or alternative shape to avoid receiving the forces from the forward and rearward bumpers 50, 52.

In addition, as shown in FIGS. 6-8, a recessed cavity 62 is formed in the body portion 54 on the side opposite the attachment features 56 for receiving an end portion of the mechanical fastener 60, such as a portion of a head 64 of the fastener 60. The recessed cavity 62 has a cylindrical shape and is coaxially aligned with mounting aperture 58. The recessed cavity 62 allows the head 64 of the mechanical fastener 60 to be at least partially concealed to reduce the length of the mechanical fastener 60 extending outward beyond the body portion 54 of the slide stop 26. It is also contemplated that the fastener 60 may be reversed to have a nut of the fastener 60 within the recessed cavity 62, or that an alternative mechanical fastener may be arranged in the mounting aperture 58 and the recessed cavity 62. With such an arrangement, the mechanical fastener 60 may be removed to allow the longitudinal position of the slide stop 26 to be adjusted to various positions along the rail for increasing or decreasing the sliding movement of the carriage bracket 20 and corresponding hitch plate 22 with respect to the longitudinal rail 12.

Figure 9:
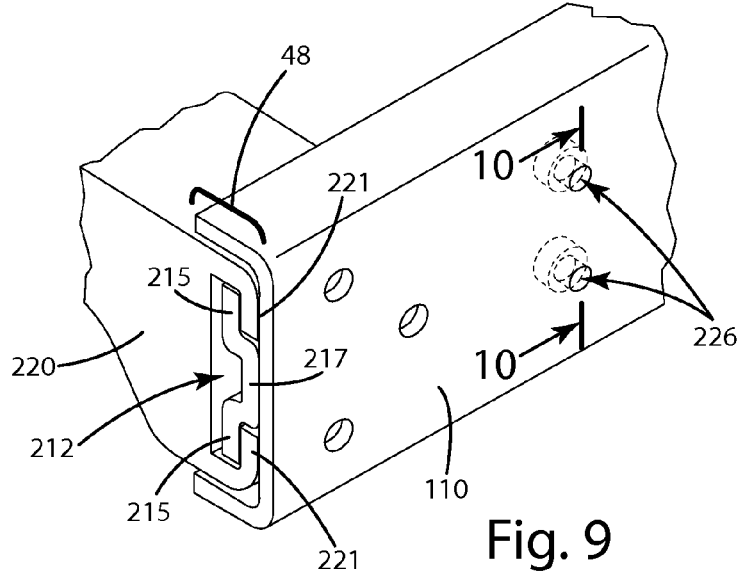
FIG. 9 is a top perspective view of an additional embodiment of the longitudinal rail of the sliding fifth wheel hitch assembly having an a slide stop.

Referring now to FIG. 9, an additional embodiment of the sliding fifth wheel hitch assembly 10 includes a carriage bracket 220 that engages a track 217 that extends along the inboard cavity portion of the frame member 110 of the vehicle 100, together defined as a longitudinal rail 212. The carriage bracket 220 similarly slidably supports a hitch plate 22 for receiving the kingpin of the trailer. The longitudinal rail 212 includes a pair of flanges 215 that extend away from the frame member 110 and are slidably engaged by arm portions 221 of the carriage bracket 220.

Figure 10:
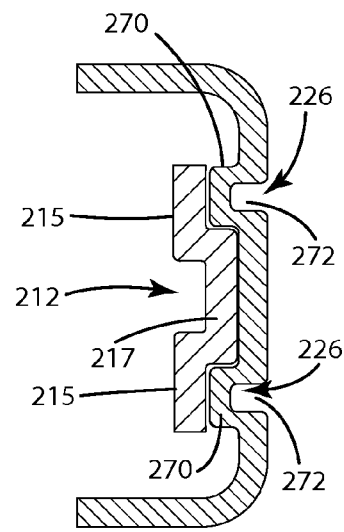
FIG. 10 is a cross-sectional side view of the additional embodiment of a slide stop, taken at line 10-10 of FIG. 9.

As further illustrated in FIG. 10, the additional embodiment of slide stops 226 shown in FIG. 9 each include a protrusion 270 laterally extending inward to abut the arm portions 221 of the carriage bracket 220. A corresponding cavity 272 is located on the exterior side of the frame member 110 opposite the protrusion 270. In such an arrangement, the depth of the cavity 272 is generally equivalent to the height of the protrusion 270, as the cavity 272 and protrusion 270 are formed by punching the cavity 272 into the exterior side of the frame member 110. As illustrated, in FIG. 3, this example of an integral slide stop 226 is formed in an oval shape and protruding from the exterior surface 40 of the side member 14 proximate the first end portion 16 and the second end portion 18 of the longitudinal rail 12. It is also conceivable that the slide stop 226 may be adapted with alternative shaped protrusions and by forming methods other than punching, such as hydroforming or welding, without departing from the invention.

Figure 11:
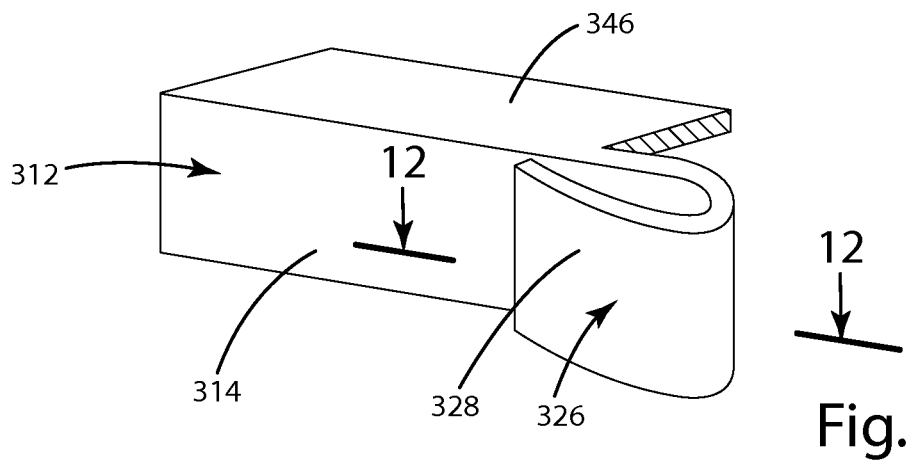
FIG. 11 is a top perspective view of an additional embodiment of the longitudinal rail of the sliding fifth wheel hitch assembly having a slide stop.
Figure 12:
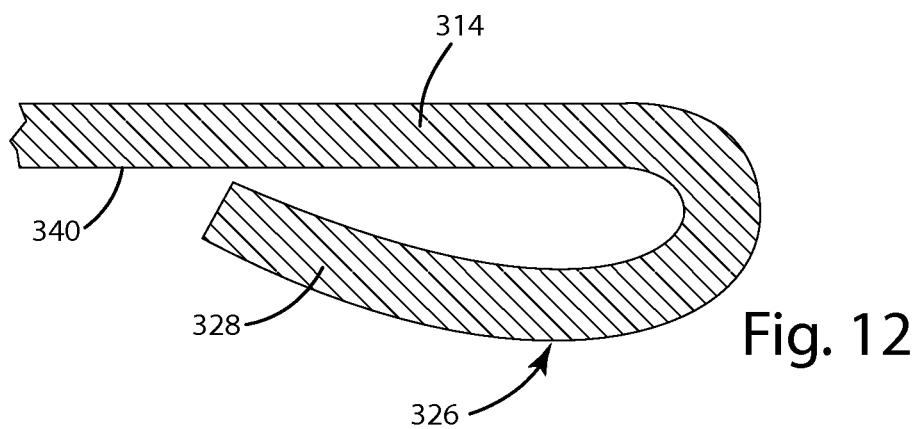
FIG. 12 is a cross-sectional side view of an additional embodiment of the slide stop taken at line 12-12 of FIG. 11.

Another embodiment of a slide stop 326 is shown in FIGS. 11-12. The illustrated slide stop 326 is formed as a single, integral piece of an L-shaped longitudinal rail 312 that is slidably engaged with the carriage bracket 20 similar to that shown in FIG. 2. More specifically, the slide stop 326 includes a curled portion 328 that is formed by cutting away a section of a top member 346 of the longitudinal rail 312, leaving a portion of a side member 314 of the longitudinal rail 312 free to be folded onto an exterior surface 340 of the longitudinal rail 312 in the curled shaped. Accordingly, the slide stop 326 is formed at either the first or second end portion 16, 18 of the longitudinal rail 312 to abut the carriage bracket 20 for limiting the sliding movement thereof. The slide stop 326 reduces the manufacturing steps and utilizes the existing side member, thereby reducing manufacturing cost and time.

In operation, the sliding movement of the hitch plate 22 is limited by the slide stop 26. Further, the carriage bracket 20 supporting the hitch plate 22 has a lower portion 48 that is slidable with the carriage bracket 20 on the longitudinal rail 12. The hitch plate 22 has a throat 30 for receiving the kingpin of a trailer. The rail 12 slidably supports the carriage bracket 20 and has a first end portion 16 and a second end portion 18. The engagement assembly 24 releasably engages the rail 12 between the first end portion 16 and the second end portion 18, thereby selectively positioning the hitch plate 22 with respect to the rail 12. The slide stop 26 is positioned between the first end portion 16 and the second end portion 18 of the rail 12. The slide stop 26 is positioned to abut the lower portion of the carriage bracket 20, thereby limiting the sliding motion of the hitch plate 20 with respect to the rail 12. The slide stop 26 may be a separate piece or integrally formed in the rail 12 or frame member 110.

In the foregoing description it will be readily appreciated by those skilled in the art that modifications may be made to the invention without departing from the concepts as disclosed herein. Such modifications are to be considered as included in the following claims, unless these claims by their express language state otherwise.

The invention claimed is:

1. A sliding fifth wheel hitch assembly, comprising;
a longitudinal rail having a substantially vertical side member, a first end portion, and a second end portion;
at least one carriage bracket slidably engaged with the longitudinal rail, the carriage bracket adapted to support a hitch plate;
an engagement assembly coupled with the carriage bracket for releasably engaging the longitudinal rail along a length of the longitudinal rail between the first and second end portions;
and a slide stop laterally extending from the side member of the longitudinal rail proximate at least a select one of the first end portion and the second end portion, wherein the slide stop is positioned to abut the carriage bracket, thereby limting a sliding motion of the hitch plate with respect to the longitudinal rail, wherein the slide stop includes a body portion abutting the side member and a pair of protrusions laterally extending from the body portion and engaging a corresponding pair of engagement apertures extending through the side member, wherein the slide stop includes a mounting aperture between the pair of protrusions and a fastener engaging the mounting aperture and one engagement aperture in the side member to secure the slide stop with the longitudinal rail, and wherein the pair of protrusions are configured to transfer force to the longitudinal rail that is received from limiting the sliding motion of the hitch plate.

2. The sliding fifth wheel hitch assembly of claim 1, wherein the fastener extends through the mounting aperture and the side member, thereby securing the slide stop with the longitudinal rail.

3. The sliding fifth wheel hitch assembly of claim 1, wherein the slide stop abuts an exterior surface of the side member.

4. A sliding fifth wheel hitch assembly, comprising:
a rail having a substantially vertical side member with a plurality of engagement apertures spaced along a length of the rail;
a carriage bracket slidably engaged with the rail and extending upward to support a hitch plate, the carriage bracket having a forward bumper and a rearward bumper laterally adjacent to the side member;
an engagement assembly operably coupled with the carriage bracket and releasably engaging the rail along the length of the rail, thereby selectively positioning the hitch plate with respect to the rail; and
a slide limiting assembly, comprising:
a body portion removably coupled with the side member and positioned to abut one of the forward bumper and the rearward bumper for limiting a sliding travel of the hitch plate with respect to the rail, wherein the body portion includes a mounting aperture and a pair of protrusions laterally extending from the opposing sides of the mounting aperture to removably engage a corresponding pair of the plurality of engagement apertures; and
a fastener extending through the mounting aperture and engaging an intermediate aperture of the plurality of engagement apertures between the corresponding pair of the plurality of engagement apertures that engage the pair of protrusions to secure the slide limiting assembly with the rail, wherein the pair of protrusions are configured to transfer force to the rail that is received from limiting the sliding travel of the hitch plate.

5. The sliding fifth wheel hitch assembly of claim 4, further comprising:
a forward slide stop extending laterally outward from the side member and positioned to abut the forward bumper thereby limiting the sliding travel of the hitch plate with respect to the rail in a forward direction; and
a rearward slide stop extending laterally outward from the side member and positioned to abut the rearwardly located bumper, thereby limiting the travel of the hitch plate with the rail in a rearward direction, wherein the slide limiting assembly is configured to couple with the side member between the forward and rearward slide stops.

6. The sliding fifth wheel hitch assembly of claim 4, wherein the engagement assembly releasably engages at least one of the plurality of engagement apertures extending through the side member for positioning the hitch plate at incremental positions on the rail.

7. The sliding fifth wheel hitch assembly of claim 4, wherein the body portion abuts an exterior surface of the side member.

8. The sliding fifth wheel hitch assembly of claim 4, wherein the rail is a section of a vehicle frame and the carriage bracket is pivotally supporting the hitch plate.

9. The sliding fifth wheel hitch assembly of claim 4, wherein an outer surface of the pair of protrusions abuts an inner surface of the corresponding pair of the plurality of engagement apertures and an exterior surface of the fastener is spaced from an interior surface of the intermediate aperture, such that the fastener is isolated from transmitted forces between the forward or rearward bumper and the rail.

10. A sliding fifth wheel hitch assembly, comprising:
a longitudinal rail having a substantially vertical side member that includes a plurality of engagement apertures spaced longitudinally along the side member;
a carriage bracket slidably engaged with the rail and having an upper portion coupled with a hitch plate and a lower portion laterally adjacent to an exterior surface of the side member that includes a forward bumper and a rearward bumper;
an engagement assembly operably coupled with the carriage bracket and releasably engaging at least a select one of the plurality of engagement apertures for selectively positioning the hitch plate with respect to the rail; and
a slide stop having a body portion abutting the exterior surface of the side member and at least one attachment feature laterally extending from the body portion and removably engaging at least one of the plurality of engagement apertures, wherein the body portion is positioned to abut a select one of the forward bumper and the rearward bumper for limiting a sliding travel of the hitch plate with respect to the rail, wherein a fastener extends through the body portion at a location spaced from the attachment feature to engage the side member, such that the fastener is prevented from transmitting forces between the forward or rearward bumper and the rail, wherein the slide stop includes a mounting aperture and the fastener extends through the mounting aperture and at least one of the plurality of engagement apertures to secure the slide stop with the rail, wherein the attachment feature of the slide stop includes a pair of protrusions laterally extending from opposing sides of the mounting aperture to removably engage a corresponding pair of the plurality of engagement apertures, and wherein the pair of protrusions are configured to transfer force to the rail that is received from limiting the sliding travel of the hitch plate.

11. The sliding fifth wheel hitch assembly of claim 10, wherein the longitudinal rail is coupled with a rear section of a vehicle frame and the carriage bracket is pivotally supporting the hitch plate.

\* \* \* \* \*